United States Patent [19]

Hayes et al.

[11] Patent Number: 5,313,265
[45] Date of Patent: May 17, 1994

[54] NON-CONTACT NON-DESTRUCTIVE LATENT IMAGE SCANNER

[75] Inventors: Guy H. Hayes, New Hartford; Robert M. Dixon, New Milford, both of Conn.

[73] Assignee: Hughes Aircraft Company, Los Angeles, Calif.

[21] Appl. No.: 844,357

[22] Filed: Mar. 2, 1992

[51] Int. Cl.$^5$ .............................................. G01B 9/02
[52] U.S. Cl. ................................... 356/345; 356/355; 356/372; 356/376
[58] Field of Search .................. 382/4.5, 66; 346/160; 356/345, 349, 355, 357, 358, 272, 376, 378, 379, 380, 381; 250/561

[56] References Cited

U.S. PATENT DOCUMENTS

| | | | |
|---|---|---|---|
| 4,191,940 | 3/1980 | Polcyn et al. | 356/345 |
| 4,657,394 | 4/1987 | Halioua | 356/376 |
| 4,817,183 | 3/1989 | Sparrow | 356/4 |

Primary Examiner—Edward L. Coles, Sr.
Assistant Examiner—John Ning
Attorney, Agent, or Firm—Michael W. Sales; Wanda K. Denson-Low

[57] ABSTRACT

A latent image scanner 10 comprising a three-color laser-diode interferometer 11 having either thickness gauge optical geometry 12 or profiler optical geometry 12a is focused on a spot on a surface of a reference optic 14 having a latent image residue thereon. The interferometry thickness gauge 10 or profiler 10a measures and records the height and location of the spot. The scanner 10 is then focused on a new spot by moving an associated X-Y mechanical translator 13. A complete scan of the surface of the reference optic 14 results in a three dimensional data array correlating height profile to X-Y coordinates of the surface of the reference optic 14. The difference between the absolute height profile and the known height of the reference optic 14 represents the latent image.

14 Claims, 3 Drawing Sheets

NON-CONTACT NON-DESTRUCTIVE LATENT IMAGE SCANNER

FIELD OF THE INVENTION

The present invention relates to latent image scanning and more particularly to the application of a 3-color laser-diode interferometry to detect contact latent images which may not be visible to the naked eye or to a microscope.

DESCRIPTION OF THE PRIOR ART

There are many instances where latent image detection, for example, fingerprint, footprint, or the like, is a useful method for personal identification. Such methods for identification are frequently used by local law enforcement agencies, security agencies and hospitals. Latent image detection methods typically compare a detected latent image to a reference latent image to determine whether the detected print matches the reference. If a match occurs then additional evidence of positive identification has been discovered.

Heretofore, forensic scientists, law enforcement agencies and the like have typically "dusted" and/or "lifted" the latent images from a surface to expose the latent prints, photographed the resulting exposed latent images, and compared the results with known references either visually or by other means, such as digital graphical techniques. Unfortunately, such prior art techniques are destructive of the latent image on the surface of an object, thus, requiring that such techniques be carried out carefully because only one opportunity to detect them exists.

No prior art method of detecting latent images is known to have employed three-color laser-diode interferometry to detect latent images. The three-color laser-diode interferometry of the present invention can detect latent images that may not be visible to the naked eye or to a microscope without actually contacting the latent image or destroying the sample. Three color interferometers may be operated as thickness gauges or as profilers by using different optical geometry. Three color interferometry and the operation of a three-color interferometry profilers are discussed in P. DeGroot, "Three-Color Laser-Diode Interferometer," Applied Optics 36, 3612–3636 (1991).

SUMMARY OF THE INVENTION

The present invention contemplates a non-contact, non-destructive latent image scanner to provide a means for detecting contact latent images, such as fingerprints resulting from the contact of a finger with a surface. The scanner of the present invention can detect latent images that may not be visible to the naked eye or even to a microscope. The present invention allows the creation of a digital image of the print without destruction thereof. The invention achieves non-destructive scanning by using three-color laser-diode interferometry methods to detect the change in the surface profile, or optical thickness, of a reference optic caused by the presence of a latent image. The three-color laser-diode interferometers of the present invention can have thickness gauge geometry or profiler geometry.

Thus, as briefly discussed above, the present invention may be used to detect fingerprints. When a finger contacts a surface, natural oils in the skin are deposited onto the surface. In this way, a polished flat surface contacted by a finger leaves a latent print. The latent print changes both the surface height and/or the local index of refraction thereof and provides a surface that can be analyzed by the three-color laser-diode interferometry thickness gauge or profiler. The latent image scanner of the present invention can automatically scan over the area of the latent image and record the changes in optical thickness or local index of refraction as a function of surface position. The natural oils deposited on the surface when scanned by the thickness gauge or profiler are translated into digital peaks and valleys corresponding to the whorls of the latent image oil residue. Thus, the resulting scan data of a completed scan is in the form of a digital array of optical thickness or surface profile data, and is readily stored in a disk file for future processing.

A primary objective of the present invention is to provide a latent image scanner.

Another objective of the present invention is to provide a non-contact and a non-destructive latent image scanner.

Another objective of the present invention is to provide a non-destructive, non-contact latent image scanner that can translate a surface having a latent image into a digital array of optical thicknesses for given surface coordinates which can readily be stored on a disk.

Other objects and advantages will become apparent to those skilled in the art from the following detailed description read in conjunction with the attached drawings and claims appended hereto.

DETAILED DESCRIPTION OF THE PRESENT INVENTION

Figure 1:
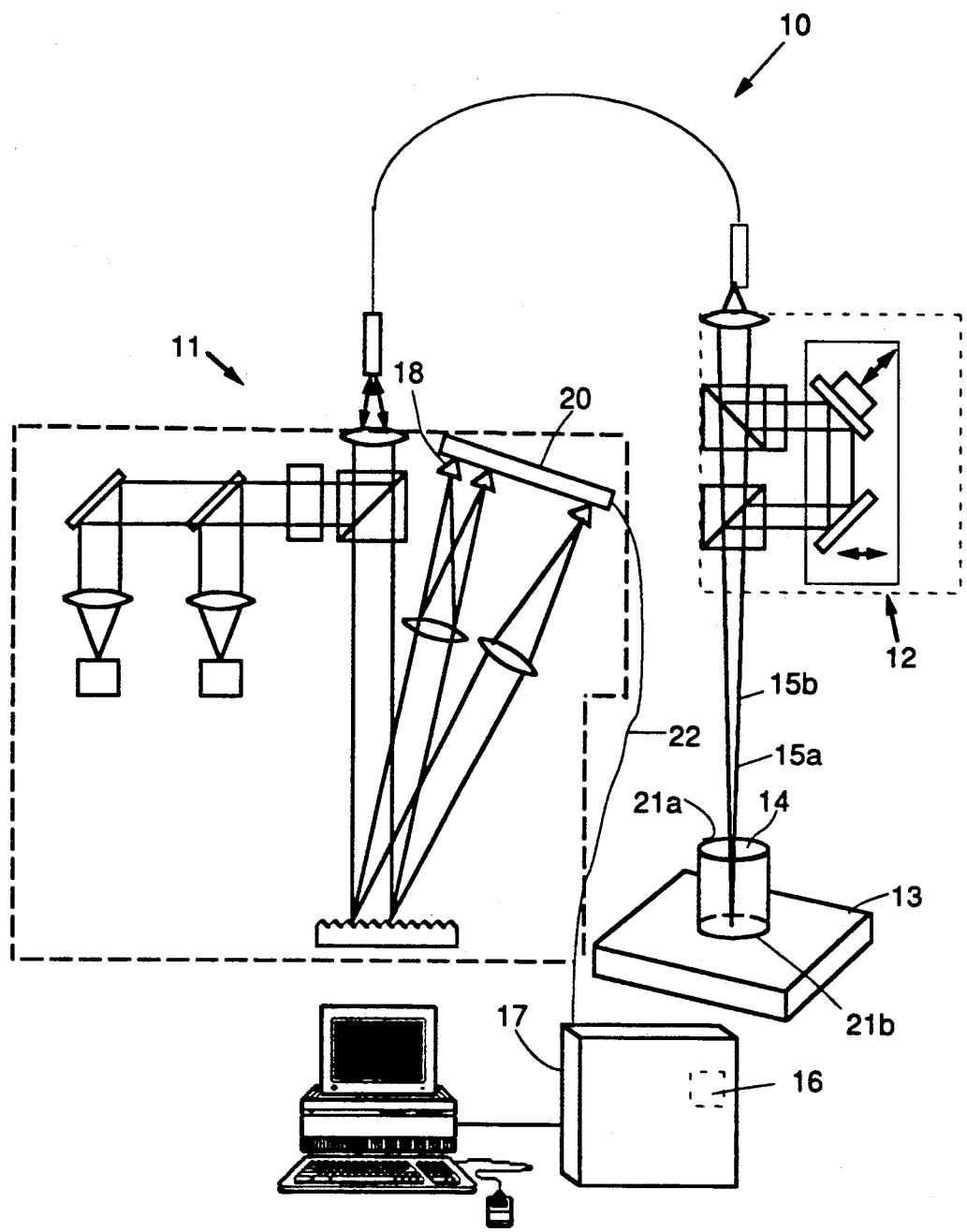
FIG. 1 shows a three-color laser-diode interferometry scanner having thickness gauge optical geometry.
Figure 2:
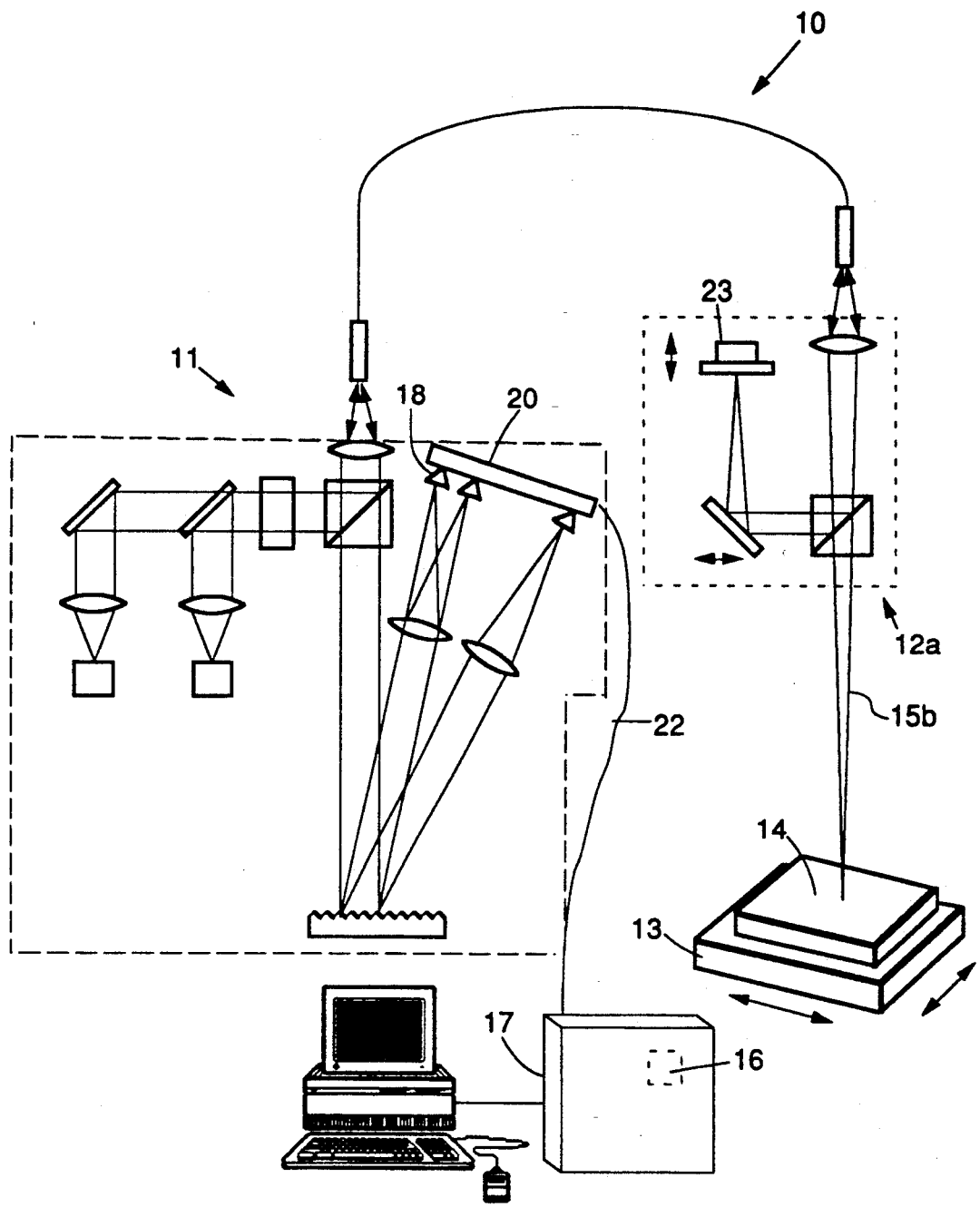
FIG. 2 shows a three-color laser-diode interferometry having profiler optical geometry.

FIG. 1 shows a latent image scanner employing a three-color laser-diode interferometer with thickness gauge optical geometry. FIG. 2 shows an alternative embodiment of the latent image scanner of the present invention employing a three-color interferometry profiler. Referring to FIGS. 1 and 2, a non-contact, non-destructive latent image scanner 10 comprises a standard three-color laser-diode interferometer 11 having thickness gauge geometry 12 or profiler optical geometry 12a, a movable X-Y mechanical translator 13, and an associated reference optic specifically substrate 14. Interferometers 11 having thickness gauge geometry 12 or profiler geometry 12a are used to detect the change in surface profile or optical thickness of an object. The thickness gauge geometry shown in FIG. 1 transmits both reference 15a and object 15b beams to the "substrate" 14, such that the reference beam is focused on the substrate surface 21a nearest the interferometer and the object beam on the surface 21b farthest from the interferometer. The primary advantage of this device is that the measurements are independent of stage motions in the direction of the measurement, e.g., vertical runout of the translation stage in FIG. 1, since such motions are common to both reference and object beams. The primary constraint of this device is that the reference surface 21a of the "substrate" needs to be polished and transmissive, e.g., a polished optical flat or equivalent, to permit the object beam to impinge on the measurement surface 21b. However, the measurement surface 21b need not be polished.

The profiler geometry shown in FIG. 2 transmits only one beam, the object beam 15b, to the substrate on the X-Y translation stage. The reference path is contained within the profiler head assembly 23, thus each measured profile includes the motions of the stage, e.g., vertical runout. The primary advantage of such a device is the ability to scan opaque objects, that is the substrate need not be transmissive. Discussion of the operation of three-color interferometers can be found in P. DeGroot, "Three-Color Laser-Diode Interferometer," Applied Optics 36, 3612–3636 (1991).

The latent image scanner of the present invention is ideally suited for non-destructive and non-contact fingerprint scanning. When a finger contacts a surface of an object, the skin of the finger deposits natural oils onto the surface. The oil residue left on the object varies in height according to a mirror image of a pattern of whorls of the actual "fingerprint" of the finger. Therefore, the height profile along any direction of the plane of the surface where the fingerprint lies varies in height.

If a fingerprint is deposited on the surface of a reference optic 14, the natural oil deposits from the skin change the height profile of the surface of the reference optic 14 in the same manner as the surface of any other object with a fingerprint thereon. An image of the fingerprint can be stored in the memory 16 of a computer 17 by scanning the surface of the reference optic 14 with the latent image scanner 10 and recording the height profile of the reference optic 14 with the fingerprint thereon. Thus, to scan the reference optic 14 for a fingerprint, the reference optic 14 is placed on the high precision X-Y mechanical translator and is scanned to derive a reference profile for the optic 14. The scan is commenced by focusing the scanner 10 onto a starting spot on the surface of the optic 14. The height or thickness of the spot is measured by a trio of detectors 18 connected to an input/output communications interface 20. The height measurement data is downloaded to computer 17 through the interface 20 and a communications link 22 where it is recorded in computer memory 16. Because the recorded measurement is stored in a digital form in memory 16 it can be readily imported into a database for storage, recall, display, digital comparison to other reference latent images in a database or any other useful digital data manipulations. After measurement and recordation, the X-Y mechanical translator 13 is then moved incrementally to a new spot on the surface in a predetermined manner where a new measurement and recordation is performed. Thus, by repetitive measurement, recordation and movement of the X-Y mechanical translator 13 so that the scanner 10 scans over the entire surface area, a profile of the reference optic 14 can be derived.

Once the reference profile is derived, a fingerprint profile can be obtained by commencing another scan of the optic 14 with a fingerprint thereon. The process is begun by placing a fingerprint on the reference optic 14. The scanner 10 is then run through the same scan routine as was performed when deriving the reference profile.

Figure 3:
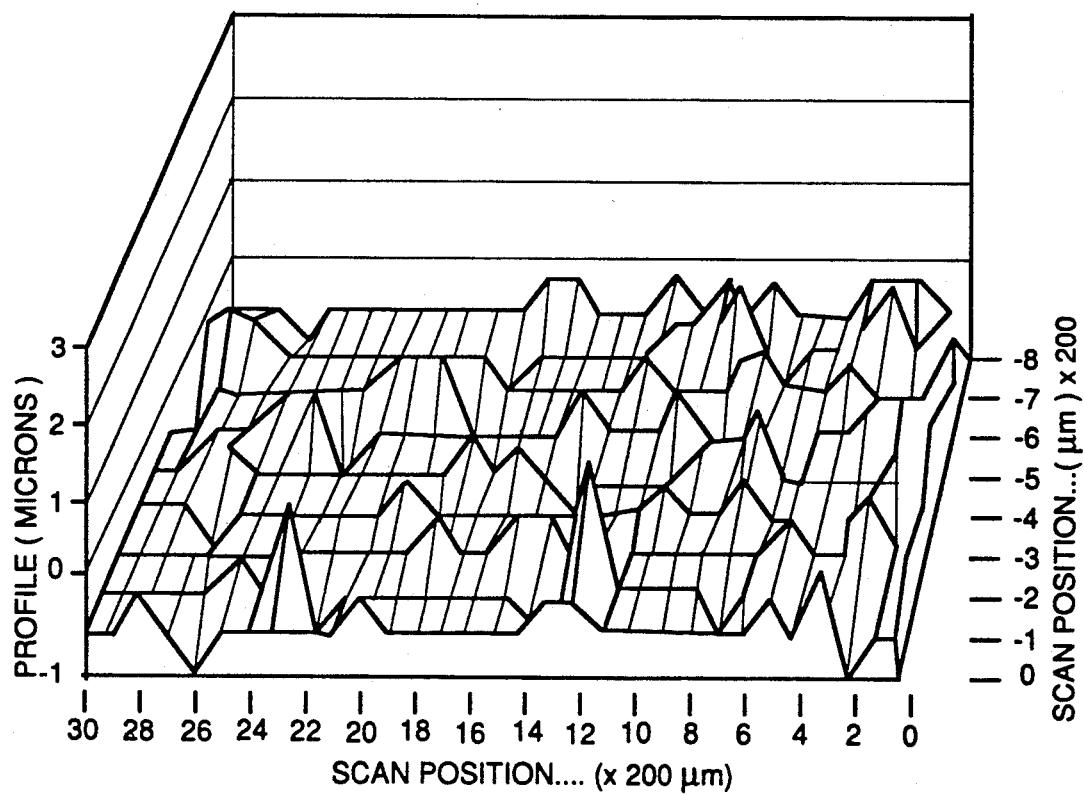
FIG. 3 shows a thickness scan graph relating thickness to X-Y scan position.

A complete fingerprint scan results in a three dimensional array of scan data relating height profile to the position on the X-Y mechanical translator 13. FIG. 3 shows a three dimensional graphic representation of an absolute fingerprint profile derived from the three-dimensional scan data array produced by the scanner 10.

The resulting scan profile is an absolute measurement of the surface height of the fingerprint on the reference optic 14. The difference between the fingerprint reference profile and the known height profile of the reference optic 14 for a given X and Y coordinate yields the particular characteristics of the fingerprint at a given spot on the surface. The difference between the absolute height profile and the known profile of the reference optic 14 for all the coordinates represents the fingerprint. The scan technique described above is not restricted to using an X-Y stage, a properly controlled beam deflector system scanning the output beam across the sample containing a latent image thereon could be used as an alternative means for scanning the reference optic 14.

Although, the invention has been described by scanning the reference optic 14 first to derive a reference profile, this scan is not necessary to practice the present invention. This reference scan will, however, allow a derivation of qualitative data by the user of the present invention.

Whereas the invention has been described for measuring a latent image, such as a fingerprint, on the top surface of the reference optic 14, the invention will perform equally well if the latent image is located on the bottom surface of the reference optic 14.

Because the scan never contacts the latent image, the scan is non-destructive and the latent image can be scanned repeatedly if desired. The latent image scanner can be made transportable and compact, thus providing equipment for producing rapid identification for an investigative team at an investigation site.

Thus, what has been described is a latent image scanner that can scan a surface for residue of a latent image left thereon without contact and destruction of the residue. The latent image scanner provides a means for precision digital analysis of a latent image residue.

What is claimed is:

1. A method for detecting and recording the information resulting from a latent image residue place on a surface, comprising the steps of:
    a) focusing an image scanner on a spot of the surface where a latent image is located;
    b) measuring the height of the surface of the latent image residue on the spot;
    c) recording the height measurement and location coordinates of the spot;
    d) moving the focus of said latent image scanner to a new spot having different coordinates on the surface of said object in a predetermined manner; and
    e) repeating steps a through d so as to detect and record the height information of at least a portion of the latent image residue, wherein said image scanner comprises a three-color laser-diode interferometer.

2. The method of claim 1, wherein said three-color laser-diode interferometer has thickness gauge optical geometry.

3. The method of claim 1, wherein said three-color laser-diode interferometer has profiler optical geometry.

4. The method of claim 1, wherein the recording of the height information and the location coordinates is performed by a computer and its associated memory.

5. The method of claim 1, wherein said focus moving is in an X-Y Cartesian plane.

6. The method of claim 5, wherein the focus moving is accomplished by moving an X-Y mechanical translator associated with said latent image scanner.

7. A method for detecting and recording the information resulting from a latent image residue place on a surface, comprising the steps of:
 a) focusing a latent image scanner comprising a three-color laser-diode interferometry thickness gauge on the spot of the surface where a latent image is located;
 b) measuring the height of the latent image residue on the surface at said spot;
 c) recording the height measurement and location coordinates of the spot by a computer;
 d) moving the focus of said latent image scanner to new coordinates on an X-Y plane of the surface in a predetermined manner by moving an X-Y mechanical translator associated with said latent image scanner; and
 e) repeating steps a through d so as to detect and record the height information at least a portion of the latent image residue.

8. A method for detecting and recording information resulting from a latent image residue place on a surface, comprising the steps of:
 a) focusing a latent image scanner comprising a three-color laser-diode interferometry profiler on the spot of the surface where a latent image is located;
 b) measuring the height of the latent image residue on the surface at said spot;
 c) recording the height measurement and location coordinates of the spot by a computer;
 d) moving the focus of said latent image scanner to new coordinates on an X-Y plane of the surface in a predetermined manner by moving an X-Y mechanical translator associated with said latent image scanner; and
 e) repeating steps a through d so as to detect and record the height information of at least a portion of the latent image residue.

9. A latent image scanner comprising:
 a) means for focusing an image scanner on a spot of a surface where a latent image is located;
 b) means for measuring the height of the latent image residue on the surface of said spot;
 c) means for recording the height measurement and location coordinates of the spot; and
 d) means for controlling the movement of the focus of said image scanner in a predetermined manner, so as to focus, measure and record the height of at least a portion of the latent image residue, wherein the means for measuring the height of the residue is a three-color laser-diode interferometer.

10. The latent image scanner of claim 9, wherein the three-color laser-diode interferometry has optical thickness geometry.

11. The latent image scanner of claim 9, wherein the three-color laser-diode interferometry device has profiler geometry.

12. The latent image scanner of claim 9, wherein the means for recording the height measurement and location coordinates is computer memory.

13. The latent image scanner of claim 9, wherein the means for moving the focus is an X-Y mechanical translator.

14. The latent image scanner of claim 9, wherein the means for controlling the latent image scanner to scan at least a portion of the latent image residue is a computer.

* * * * *